United States Patent
Van Der Vleuten et al.

(10) Patent No.: US 6,462,681 B1
(45) Date of Patent: Oct. 8, 2002

(54) SCALABLE CODING BY SCANNING SELECTED PARTS OF RESPECTIVE BIT-STREAMS

(75) Inventors: Renatus Josephus Van Der Vleuten, Eindhoven (NL); Christian Hentschel, Eindhoven (NL); Richard Petrus Kleihorst, Eindhoven (NL)

(73) Assignee: Koninklijke Philips Electronics N. V., New York, NY (US)

( * ) Notice: Subject to any disclaimer, the term of this patent is extended or adjusted under 35 U.S.C. 154(b) by 0 days.

(21) Appl. No.: 09/830,218

(22) PCT Filed: Aug. 24, 2000

(86) PCT No.: PCT/EP00/08272
§ 371 (c)(1),
(2), (4) Date: Apr. 23, 2001

(87) PCT Pub. No.: WO01/17269
PCT Pub. Date: Mar. 8, 2001

(30) Foreign Application Priority Data

Aug. 27, 1999 (EP) .............................................. 99202775
Nov. 18, 1999 (EP) .............................................. 99203839
Mar. 23, 2000 (EP) .............................................. 00201038

(51) Int. Cl.$^7$ ................................................ H03M 7/00
(52) U.S. Cl. .............................. 341/50; 382/232; 341/51
(58) Field of Search ................................. 382/232, 250; 341/50, 51, 67, 65, 52, 54

(56) References Cited

U.S. PATENT DOCUMENTS

| 5,315,670 | A | * | 5/1994 | Shapiro ........................ 382/156 |
| 6,002,794 | A | * | 12/1999 | Bonneau et al. ............. 382/166 |
| 6,014,467 | A | * | 1/2000 | Asano ......................... 382/250 |
| 6,212,234 | B1 | * | 4/2001 | Andoh et al. ........... 375/240.08 |

FOREIGN PATENT DOCUMENTS

| WO | 9801070 | 6/1998 |
| WO | 0008272 | 8/2000 |

* cited by examiner

Primary Examiner—Peguy JeanPierre
(74) Attorney, Agent, or Firm—Russell Gross

(57) ABSTRACT

A signal having blocks of values is coded by: producing respective bit-streams (DCT_1 ... DCT_N) for respective individual blocks, and obtaining a scalable bit-stream by cyclically and sequentially scanning selected parts (P1,P2, ... ) of the respective bit-streams (DCT_1 ... DCT_N) of the respective individual blocks, wherein, in a given scanning cycle, the respective bit-streams (DCT_1 ... DCT_N) are scanned in an order of decreasing significance. In a further embodiment, the blocks represent a coded image and the given scanning cycle starts at a block approximately at a center of the coded image. In another embodiment, the blocks represent a coded image and the given scanning cycle scans the respective bit-streams in an image-adaptive order being determined by a predetermined criterion, such as a contrast value.

17 Claims, 4 Drawing Sheets

SCALABLE CODING BY SCANNING SELECTED PARTS OF RESPECTIVE BIT-STREAMS

WO 99/16250 discloses an embedded DCT-based still image coding algorithm. An embedded bit-stream is produced by the encoder. The decoder can cut the bit-stream at any point and therefore reconstruct an image at a lower bit-rate. Since an embedded bit-stream contains all lower rates embedded at the beginning of the bit-stream, the bits are ordered from the most important to the less important. Using an embedded code, the encoding simply stops when the target parameter as the bit count is met. In a similar manner, given the embedded bit-stream, the decoder can cease decoding at any point and can produce reconstructions corresponding to all lower-rate encoding. The quality of the reconstructed image at this lower rate is the same as if the image was coded directly at that rate.

The DCT is orthonormal, which means that it preserves the energy. An error in the transformed image of certain amplitude will produce an error of the same magnitude in the original image. This means that the coefficients with the largest magnitudes should be transmitted first because they have the largest content of the information. This means that the information can also be ranked according to its binary representation, and the most significant bits should be transmitted first.

Coding is done bit-plane by bit-plane. The DCT coefficients are scanned and transmitted in an order starting from the upper left corner (corresponding to the DC coefficient) and ending in the lower right corner of each DCT block, i.e. from the lowest frequency coefficient to the highest frequency coefficient. Inside a block, the DCT coefficients are scanned in a diagonal order, bit plane by bit plane. After each scanned diagonal, a flag is sent telling if there are any new significant coefficients in the rest of the block.

SUMMARY OF THE INVENTION

An object of the invention is, inter alia, to provide improved scalable coding. To this end, the invention provides coding and decoding, a camera system, a receiver, a scalable bit-stream and a storage medium as defined in the independent claims. Advantageous embodiments are defined in the dependent claims.

According to an aspect of the invention, a signal comprising blocks of values is coded by a method comprising the steps of: producing respective bit-streams for respective individual blocks and obtaining a scalable bit-stream by cyclically and sequentially scanning selected parts, e.g. one or more bits, of the respective bit-streams of the respective individual blocks, wherein a given scanning cycle, respective scalable bit-streams of respective individual blocks are scanned in an order of decreasing significance. This is an improvement because when the bit-stream is truncated, blocks with a high significance are available at a higher quality than blocks with a low significance. It should be understood that the encoder and the decoder are synchronized on the scan order. A possibility is to determine the scan order in the encoder and to transmit the scan order to the decoder. Further possibilities are to use a predetermined criterion which results in a same scan order in the encoder and the decoder, without sending information concerning the scan order from the encoder to the decoder.

An advantage of processing individual blocks is that it offers the possibility to work 'on the fly' on each received block without the need for gathering and rearranging all blocks of the signal. Because the blocks are coded independently, they can be processed in parallel. By cyclically and sequentially scanning parts of the respective bit-streams which scanning step can be stopped at a certain moment, a scalable bit-stream for the signal is obtained, instead of a block-wise scalable bit-stream that would be obtained when all blocks are individually coded and concatenated.

In a preferred embodiment of the invention, the scanning cycle starts with blocks in a center of a coded image. When the bit-stream describing the coded image is truncated, the blocks near the center of the image will have a slightly higher quality than the blocks towards the edges. It has been found that emphasizing the quality in the center of the image, relative to the quality towards the edges, increases the perceptual quality of the image, since typically most interesting objects in an image are placed in the center. A linear scanning order, e.g. from left to right and from top to bottom gives rise to disturbing artifacts because of a clearly visible sudden change in image quality. For a square image, a 'perfect' spiral starting in the center and spiraling towards the edges may be used. For a rectangular image, which is practically more relevant, such a 'perfect' spiral is not possible. Therefore, an algorithm is used that 'grows' a small area with an aspect ratio that approximates that of a whole image, e.g. by repetitively adding rows or columns to the area until the entire image is covered.

In a further preferred embodiment of the invention, a given scanning cycle scans the respective bit-streams in an image-adaptive order determined by a predetermined criterion. In this embodiment, a property of the image is used to determine the scan order. Because the scan order is determined by a predetermined criterion, the scan order is the same in the encoder and the decoder and transmitting the scan order is not necessary. An example of a predetermined criterion is a contrast of the blocks. The scanning cycle starts at blocks with low contrast. Emphasizing low-contrast blocks by scanning them first, increases a perceived quality of an image because blocking artifacts tend to be more visible in low-contrast areas of the image. In an advantageous embodiment, the block scan order is completely determined by information that is available in the encoder as well as in the decoder, e.g. when the values are transform coefficients, by determining after a given scanning cycle a number of significant coefficients for each individual block, and using a scan order in a next scanning cycle, in which blocks with a low number of significant coefficients are scanned first. A significant coefficient is a coefficient for which one or more bits have already been transmitted. In this way no additional bits need to be sent to the decoder. The measure of the contrast of a given block is based on the observation that DCT blocks with higher contrast will generally have higher AC transform coefficient magnitudes. In a further advantageous embodiment, the block scan order will in general depend on a weighted combination of both the contrast of a block and the distance of the block to the center of the image.

The invention is applicable to all block-based (including blocks with dimensions 1×1, i.e. pixels) scalable image coding methods. For spatial-domain based methods, no transform coefficients are readily available, but in that case luminance values may be used.

The aforementioned and other aspects of the invention will be apparent from and elucidated with reference to the embodiments described hereinafter.

BRIEF DESCRIPTION OF THE DRAWINGS

In the drawings:

FIG. 2 shows an exemplary scan order according to the invention for a square image of 5×5 blocks;

FIG. 3 shows an exemplary scan order according to the invention for an image of 10×10 blocks;

FIG. 4 shows an exemplary scan order according to the invention for a rectangular image of 9×6 blocks;

Figure 1:
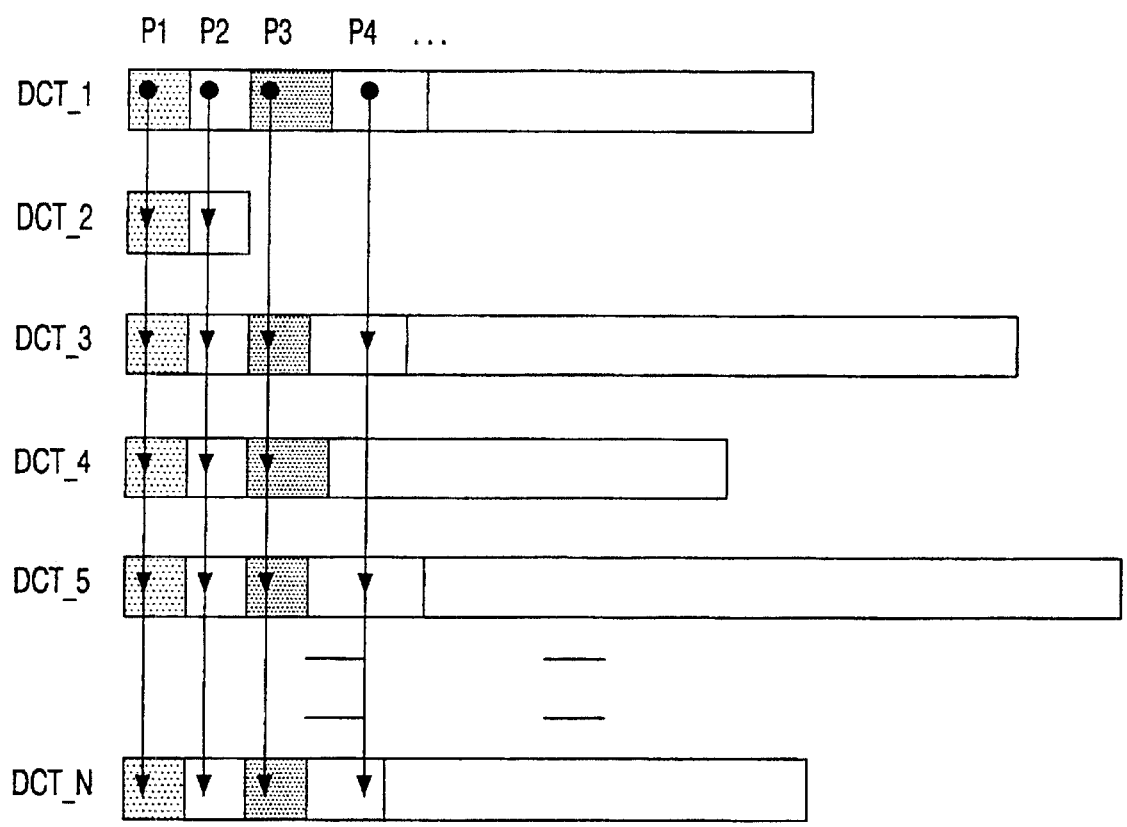
FIG. 1 shows an example of scanning scalable bit-streams of individually coded blocks according to the invention.

The drawings only show those elements that are necessary to understand the invention.

DETAILED DESCRIPTION

The invention is preferably applied in a coding method for obtaining a scalable bit-stream, such as described in more detail in non pre-published European patent application 99202775.5, filed Aug. 8, 1999 (our reference PHN 17.618) and in non pre-published European patent application 99203839.8, filed Nov. 11, 1999 (our reference PHN 17.759), the priorities of which have been claimed in this application.

A scalable bit-stream includes bits in order of decreasing significance and can be truncated at any point. An image is partitioned into rectangular blocks, e.g. 8×8 pixels. Preferably, each block is transformed separately with a two-dimensional transform, e.g. a Discrete Cosine Transform (DCT). Quantized transform coefficients are transmitted or stored in a progressive manner, such that the most important information is transmitted or stored first. This is done by successive quantization, where the coding residue is reduced step by step. After the transform, most of the energy of the image is concentrated in the low-frequency coefficients, and the rest of the coefficients have very small values. This means that there are many zeros in most significant bit planes. A bit-plane is a plane that comprises bits of the transform coefficients with certain significance. The transform coefficients are encoded and transmitted bit-plane by bit-plane, starting with the most significant bit-plane (not counting the sign plane). While encoding each bit-plane, a distinction is made between significant and insignificant coefficients. A significant coefficient is a coefficient for which one or more bits have already been transmitted (in a more significant bit plane). An insignificant coefficient is a coefficient for which no bits have been transmitted yet. That is the case if all bits in previous bit-planes were zeros. As long as a coefficient has zeros, it is regarded as insignificant. Initially all coefficients are marked insignificant. Then, starting with the most significant bit plane, the encoding is started. An indication is transmitted whether any insignificant bits are found in the current bit-plane that become significant, i.e. when a previously insignificant coefficient has a non-zero bit. If these so-called newly significant coefficients have been found, their positions are transmitted with aid of a rectangular scan zone.

After the positions of the newly significant coefficients, their sign bits are transmitted. The bits for the newly significant coefficients do not have to be transmitted, because they are always one. Otherwise, the coefficient would have remained insignificant. The above-described procedure is repeated for each bit plane until a certain stop criterion has been met, e.g. a certain bit-rate or quality or just because all bit-planes have been put into the bit-stream. For a certain bit-plane, bits of significant coefficients (zeros and non-zeros) are transmitted automatically before the indication is sent whether or not newly-significant coefficients are present in the current bit-plane. Because all coefficients are marked insignificant at the start of the procedure, for the most significant bit-plane no significant coefficients exist and only bits are transmitted for the newly significant coefficients. These newly significant coefficients are then marked significant. This means that when the next bit-plane is processed these coefficients are significant and their bits are transmitted automatically. If no newly significant coefficients are found, an indication is sent (e.g. zero-bit) and the coding proceeds with the next bit-plane.

According to the invention, the scalable coding is performed on each block individually. FIG. 1 shows how a bit-stream for an image is obtained by scanning scalable bit-streams of individually coded DCT blocks and for each scanning cycle selecting only a part P1,P2, ... of the coded transform coefficients, e.g. one or a few bits, of the individually coded blocks DCT_i with i=1 to N, where N is the total number of blocks in the image. A next scanning pass then obtains a next part of the coded transform coefficients of the DCT blocks. The number of bits in the selected parts can differ for each block or each scanning pass, e.g. depending on the significance of the part of the coded transform coefficients, as illustrated in FIG. 1 for part P3. It is possible to select some bits that represent data of certain significance or a certain coefficient, which are represented by a different amount of bits for different blocks. If a certain DCT block does not have a coded part of certain significance required in the scanning pass, the specific DCT block may be skipped, e.g. block DCT_2 is skipped in the third scanning pass because DCT_2 does not contain any coded transform coefficients anymore, i.e. the code is exhausted. It is also possible to skip a block in a certain scanning pass, because the significance is only lower than required, illustrated in the fourth scanning pass for DCT_4. It still remains possible to select a next part of the coded transform coefficients of this block DCT_4 in a next scanning pass. In this way, a scalable coding of an entire image is obtained.

According to a preferred embodiment of the invention, in a given scanning cycle, the respective scalable bit-streams DCT_1 ... DCT_N are scanned in an order of decreasing significance. This is an improvement because when the bit-stream is truncated, blocks with a high significance are available at a higher quality than blocks with a low significance. Advantageously, the scanning cycle starts with blocks in a center of the image. When the bit-stream describing the image is truncated, the blocks near the center of the image will have a slightly higher quality than the blocks towards the edges. It has been found that emphasizing the quality in the center of the image, relative to the quality towards the edges, increases the perceptual quality of the image, since typically most interesting objects in an image are placed in the center. A linear scanning order, e.g. from left to right and from top to bottom gives rise to disturbing artifacts because of a clearly visible sudden change in image quality.

Figures 2, 3, 4:
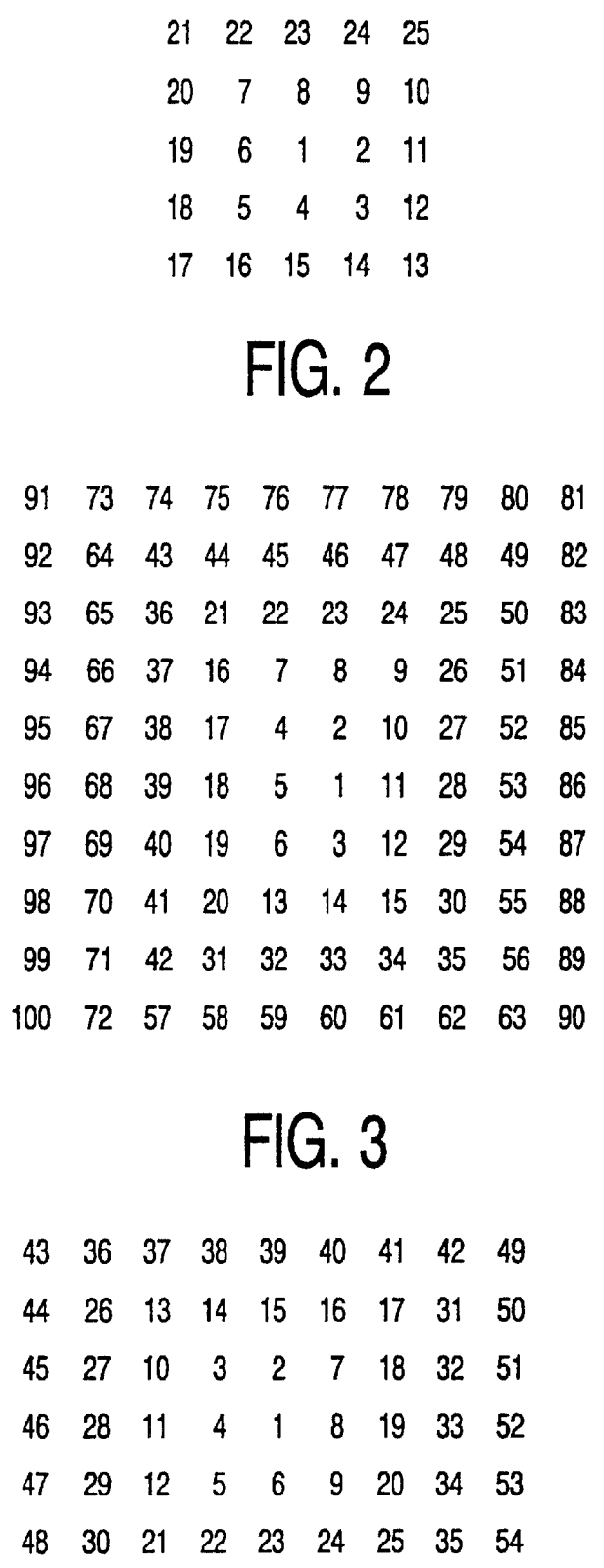

FIG. 2 shows a scan order according to the invention for a square image of 5×5 blocks. For a square image, a 'perfect' spiral starting in the center and spiraling towards the edges is possible. The blocks are scanned from 1 to N=25.

For a rectangular image, which is practically more relevant, such a 'perfect' spiral is not possible. Therefore, in a practical embodiment an algorithm is used that 'grows' a small area with an aspect ratio that approximates that of a whole image, by repetitively adding rows or columns to the area until the entire image is covered. FIG. 3 gives an example of such a scan order for a square image of 10×10 blocks, which has 80×80 pixels in case an 8×8 block DCT is used. The blocks are scanned from 1 to N=100. FIG. 4 gives an example of a rectangular image of 9×6 blocks, which has 72×48 pixels in case an 8×8 block DCT is used. The blocks are scanned from 1 to N=54. As is clear from FIGS. 3 and 4 the block numbered 1 at which the scan order starts is located approximately at the center of the image. Rows and columns are repetitively added in an alternating way to the area already scanned, while keeping the aspect ratio approximately equal to the aspect ratio of the entire image. The center of the scan area is preferably kept at approximately the center of the image. In this embodiment, the rows and columns that are added have about the same length as already available in the scanned area.

Emphasizing the quality of the blocks in the center of the image relative to the edges of the image as described above, does not take into account the visibility of blocking artifacts in low-contrast areas of the image. In another embodiment of the invention, low-contrast blocks are emphasized. A contrast measure is obtained by determining the number of significant coefficients after each scanning cycle. For each scanning cycle, one bit of the transform coefficients, i.e. the bits of one bit-plane, may be scanned and transmitted. After each scanning cycle, the blocks are sorted on their number of significant coefficients and this new block order is used in the next scanning cycle to transmit one or more next lower coefficient bit planes. As a result, blocks with the lowest number of significant coefficients are scanned and transmitted first. The initial scan order for the blocks, e.g. the transmission of the most significant bit plane, can either be linear, or non-linear according to an order as specified above wherein blocks near a center of the image are scanned first.

For those blocks that have the same number of significant coefficients, preference is given during the sorting to the blocks closer to the center of the image. This may be done according to a scan order as described above or by using a so-called 'Manhattan-distance', which is defined by the sum of horizontal and vertical distance from a block to a center. In this case multiple blocks may have the same distance measure, but there is no need for an invertible mapping; however, both encoder and decoder must use an algorithm that results in the same scan order.

In a practical embodiment, a block's contrast always overrules its distance from the center. However, other weightings are also possible, e.g. a block near an edge of the image which block has a lower contrast than a second block near the center may be scanned later than the second block. The contrast measure may depend on the application. For example, there are no AC transform coefficients readily available for spatial-domain based methods. In such a method AC transform coefficients may be generated or alternatively a difference between luminance values inside a block may be taken.

Hybrid video compression schemes, such as MPEG2 and H.263 use an image memory for motion-compensated coding. In VLSI implementations, this image is usually stored in external RAM because of its large size. To reduce overall system costs, a compression of the image is proposed by a factor 4 to 5 before storage, which enables embedding of the image memory on the encoder IC itself. In a DCT domain encoder, the input signal is directly subjected to a DCT outside of the encoding loop. (see FIGS. 5 and 6). This means that motion estimation and compensation need to be performed in the DCT-domain. The local decoding only goes as far as performing a de-quantization (IQ) and inverse MC (IMC). To take advantage of the large number of zero coefficients after quantization (Q) (still present after IQ), a scalable coder (LLC) according to the invention is used before storage. A scalable coding method is inherently lossless, but can be quantized from the bit-stream if necessary. Extraction from a memory (MEM) for motion-compensation is performed by a scalable decoder (LLD). Note that almost all of the encoder parts are now situated in the DCT-domain whereas for a traditional, non-DCT domain encoder only a limited part is situated in the DCT-domain.

To control and guarantee the actual storage, scalable compression is used as described above.

Figure 5:
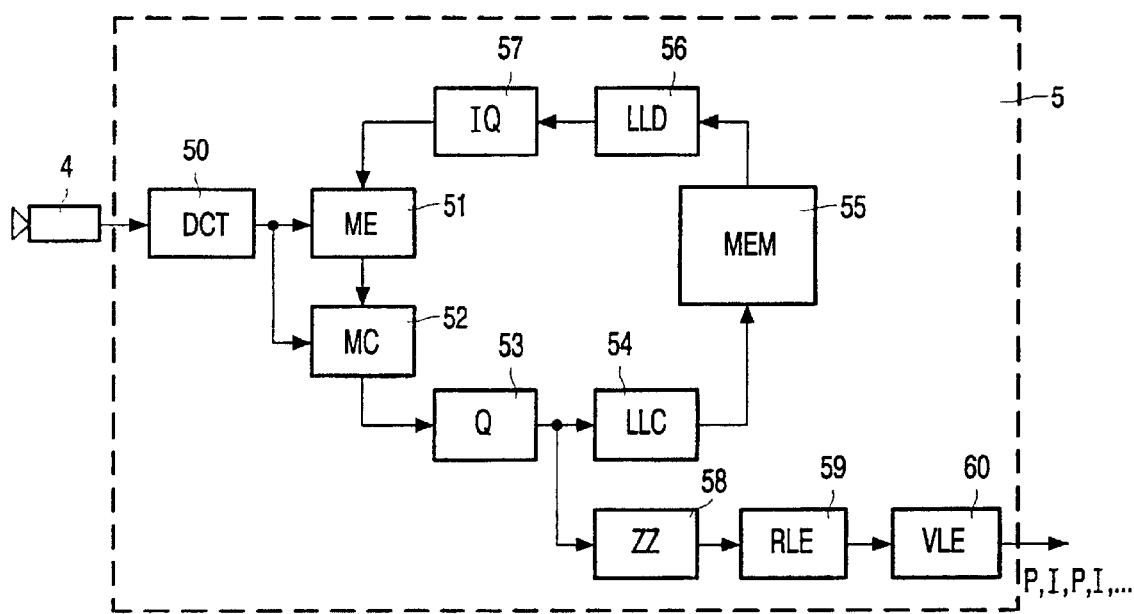
FIGS. 5 and 6 show hybrid encoders according to the invention applied in a camera system, wherein the hybrid encoders use a scalable coder to furnish a scalable bit-stream to a memory.

FIG. 5 shows a camera system comprising a first DCT domain hybrid encoder according to the invention. The hybrid encoder is in this case a so-called 'PIPI' encoder indicating that it encodes alternating I (intra) and P (inter) frames. The camera system comprises a camera 4 and a hybrid encoder 5. A signal generated by the camera 4 is first DCT transformed in DCT 50. Thereafter, the transformed signal is subjected to motion estimation in ME 51 and to motion compensation in MC 52. The motion compensated signal is quantized in Q 53. The quantized signal is further processed by a zig-zag scanner (ZZ) 58, a run-length encoder (RLE) 59 and a variable length encoder (VLE) 60 to obtain, e.g., an MPEG encoded signal. The quantized signal is further scalable coded according to the invention in an LLC 54 and thereafter furnished to a memory 55. The required size of the memory 55 can be guaranteed by the buffer/rate control mechanism of the encoder 5 itself. This is because in effect only coefficients of an intra frame I are stored in the memory 55. For applications where encoder cost and edit-ability are more important than compression ratio, such as storage applications, this is a suitable encoder. The loop memory 55 is placed just after the quantizer 53 (via the LLC 54), taking almost full advantage of the parent encoder efforts. To obtain a reconstructed frame that can be used in the motion estimator 51, the encoder further comprises a scalable decoder LLD 56 and an inverse quantizer IQ 57; both coupled to the memory 55. The scalable decoder LLD 56 performs an inverse operation of the scalable coder LLC 54.

Figure 6:
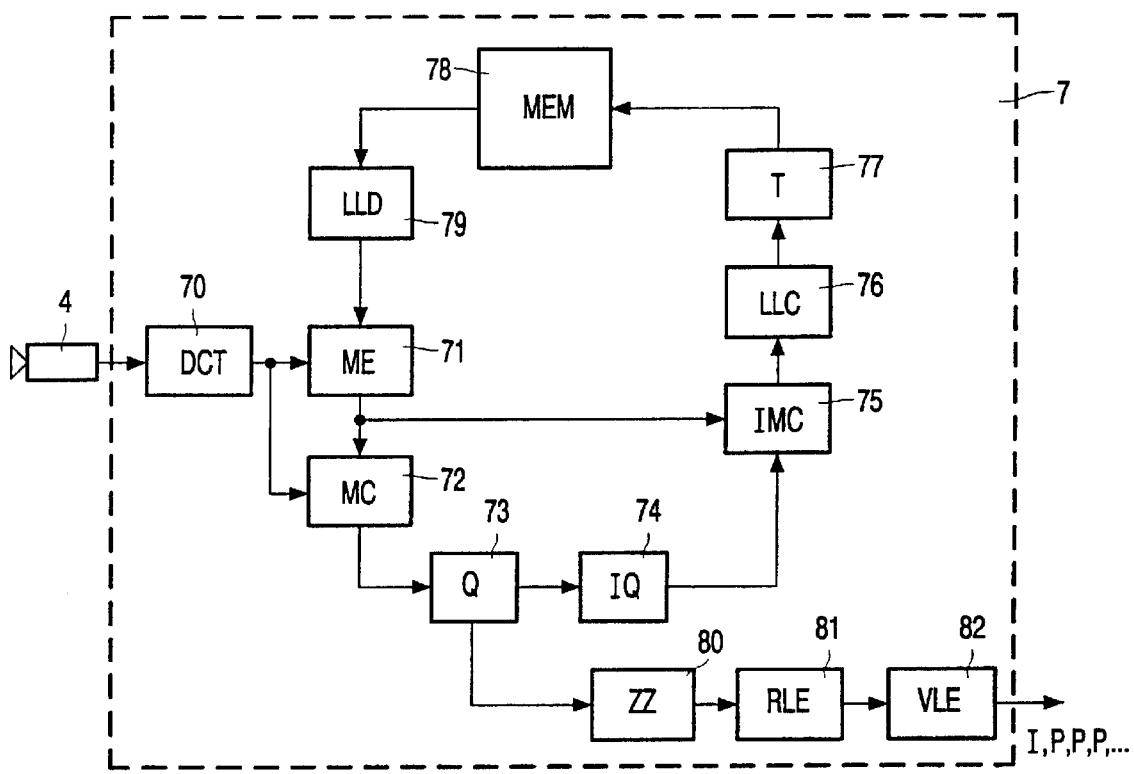

At higher compression ratios, required for lower bit-rates, successive P frames must be used. An architecture of a camera system comprising a multiple P frame encoder 7 is shown in FIG. 6. Similar to FIG. 5, the encoder 7 comprises a DCT 70, an ME 71, an MC 72, a Q 73, a ZZ 80, a RLE 81 and a VLE 82. The Q 73 is coupled via an IQ 74 to an inverse motion compensator (IMC) 75 to obtain a reconstructed signal. In between inter-coded frames P an undefined number of non-zero coefficients can now slip through the IMC mechanism 75 directly to a loop memory 78, bypassing the Q 73. A method to actively control the storage demands is to quantize the signals going into the loop memory 78. Some amount of quantization is permissible as long as the image quality stays (significantly) higher than the targeted output quality of the encoder, and the number of successive P frames is limited. This quantizing is performed by simply stripping a certain percentage of the bit-stream for each DCT block, according to the scalable coding principle.

A separate buffer control mechanism can profile the image contents and adjust this percentage on the fly. The quantization information is not needed for the decoding phase that is performed in a LLD 79. The additional quantizing is performed by truncator T 77 on a scalable bit-stream according to the invention produced by an LLC 76. A fall-back mechanism may be employed by switching to intra-blocks if the number of non-zero coefficients is higher than can be accepted. The embodiments shown in FIGS. 5 and 6 produce a standard MPEG or similar encoded bit-stream. This bit-stream can be decoded by a standard decoder.

Figure 7:
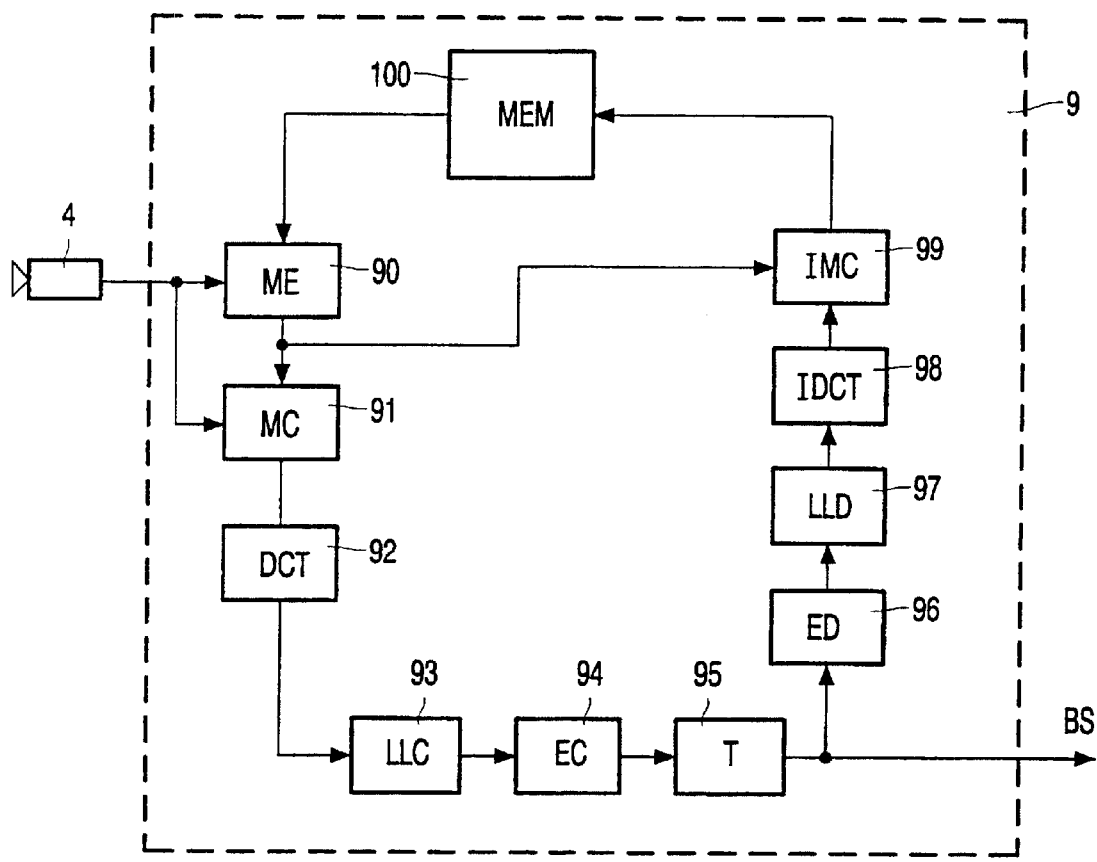
FIG. 7 shows a camera system comprising a further hybrid encoder according to the invention which uses a scalable coder to furnish a scalable bit-stream to an output of the hybrid encoder.

Although in the aforementioned embodiments scalable coding is used within an encoder, i.e. to furnish a scalable bit-stream to a loop-memory, scalable coding can also be used for transmitting a scalable bit-stream to a remote decoder. The receiver then needs means for decoding the scalable bit-stream. FIG. 7 shows a camera system comprising the camera 4 and a hybrid encoder 9. The hybrid encoder 9 comprises: a motion estimator (ME) 90, a motion compensator (MC) 91, a DCT transformer 92, a scalable coder (LLC) 93, an entropy coder (EC) 94 (optional) and a truncator (T) 95. The encoder further comprises an entropy decoder (ED) 96 (optional), a scalable decoder (LLD) 97, an inverse DCT transformer (IDCT) 98, an inverse motion compensator (IMC) 99 and a memory (MEM) 100. Instead of the standard zig-zag scanning, run-length coding and variable length coding, the scalable coder LLC 93 is used to furnish a scalable bit-stream according to the invention to an output of the hybrid coder 9. The scalable bit-stream is entropy coded in EC 94, e.g. arithmetic or Huffman coding. The embodiment according to FIG. 7 comprises a truncator (T) 95 in the output path that truncates the scalable bit-stream to obtain an output bit-stream BS with a desired bit-rate. This embodiment provides a convenient, low-complexity bit-rate control that adapts the bit-rate faster and better than an embodiment that uses a feedback loop to adapt a quantizer. Combinations of the embodiment shown in FIG. 7 with the embodiments shown in FIGS. 5 and 6 are feasible. If motion compensation is not required, an embodiment mainly comprising the DCT 92, the scalable coder LLC 93 and the truncator T 95 may be used.

Figure 8:
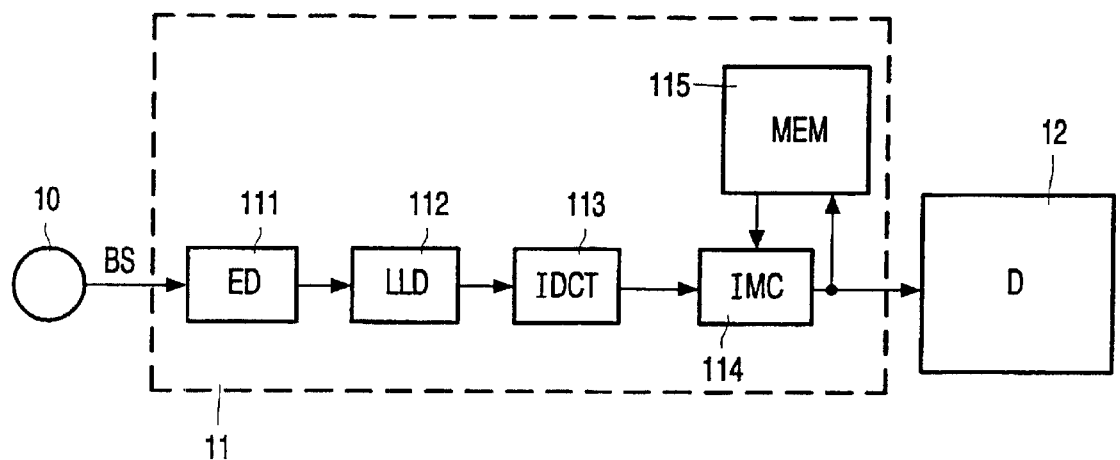
FIG. 8 shows a decoder for decoding the scalable bit-stream produced by the hybrid encoder of FIG. 7.

Because the output of the embodiment of FIG. 7 is not a standard MPEG-2 output, a non MPEG-2 standard decoder is required to decode the bit-stream BS. The decoder should be synchronized on the non-linear scanning order in the encoder. A receiver comprising a scalable decoder 11 is shown in FIG. 8. The scalable bit-stream BS is received in the decoder 11, in particular in the entropy decoder ED 111. The source of the bit-stream BS may be a storage medium 10, but can also be a transmission over some kind of medium. After entropy decoding, the bit-stream BS is scalable decoded in LLD 112. Further elements of the decoder are, an inverse DCT transformer (IDCT) 113, an inverse motion compensator (IMC) 114 and a memory (NEM) 115 which are similar to their counterparts in the encoder 9. Bits of coefficients that are affected by a truncation can be set to zero, to expected values or to random values by the decoder 11. The decoded bit-stream can be displayed on a display D 12. Depending on the complexity of the encoder, the ED 111 or the IMC 114 and the MEM 115 can be omitted.

In summary, a signal having blocks of values is coded by: producing respective bit-streams for respective individual blocks, and obtaining a scalable bit-stream by cyclically and sequentially scanning selected parts of the respective scalable bit-streams of the respective individual blocks, wherein, in a given scanning cycle, the respective bit-streams are scanned in an order of decreasing significance. In a further embodiment, the blocks represent a coded image and the given scanning cycle starts at a block approximately at a center of the coded image. In another embodiment, the blocks represent a coded image and the given scanning cycle scans the respective bit-streams in an image-adaptive order being determined by a predetermined criterion, such as a contrast value.

It should be noted that the above-mentioned embodiments illustrate rather than limit the invention, and that those skilled in the art will be able to design many alternative embodiments without departing from the scope of the appended claims. Images may be divided in sub-images, wherein the invention is applied to the sub-images rather than the image. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

What is claimed is:

1. A method of coding (54,76,93) a signal (S), the signal comprising blocks of values, the method comprising the steps of:
    producing respective bit-streams (DCT_1 . . . DCT_N) for respective individual blocks; and
    obtaining a scalable bit-stream (BS) by cyclically and sequentially scanning selected parts (P1,P2, . . . ) of the respective bit-streams (DCT_1 . . . DCT_N) of the respective individual blocks.

2. A method as claimed in claim 1, wherein the blocks represent a coded image and the given scanning cycle starts at a block approximately at a center of the coded image.

3. A method as claimed in claim 2, wherein the scanning cycle proceeds with blocks within an increasing area of the coded image, which area has an aspect ratio approximately equal to an aspect ratio of the coded image.

4. A method as claimed in claim 3, wherein the increase of the area is obtained by repetitively adding rows or columns to the area until the entire image is covered.

5. A method as claimed in claim 1, wherein the blocks represent a coded image and the given scanning cycle scans the respective bit-streams in an image-adaptive order determined by a predetermined criterion.

6. A method as claimed in claim 5, wherein the predetermined criterion is a contrast of the blocks and the scanning cycle starts at blocks with low contrast.

7. A method as claimed in claim 6, wherein the values are transform coefficients and the method further comprises the steps of:
    determining after a given scanning cycle a number of significant coefficients for each individual block; and
    using a scan order in a next scanning cycle, in which blocks with a low number of significant coefficients are scanned first.

8. A method as claimed in claim 7, wherein the number of significant coefficients are weighted with a distance to a center of the coded image.

9. A device (54,76,93) for coding a signal (S), the signal comprising blocks of values, the device comprising:
    means for producing respective bit-streams (DCT_1 . . . DCT_N) for respective individual blocks; and
    means for obtaining a scalable bit-stream (BS) by cyclically and sequentially scanning selected parts (P1,P2, . . . ) of the respective bit-streams (DCT_1 . . . DCT_N) of the respective individual blocks.

10. An encoder (9) comprising:
a device (93) as claimed in claim 9; and
a truncator (95) for truncating the scalable bit-stream (BS) at a certain bit-rate.

11. An encoder (5,7) comprising:
a device (54,76) as claimed in claim 9; and
a memory (55,78) for storing a previous frame;
the device (54,76) being arranged to furnish the scalable bit-stream to the memory (55,78).

12. A camera system comprising:
a camera (4); and
an encoder (5,7,9) as claimed in claim 10 or 11.

13. A method of decoding (11) comprising:
receiving (111) a scalable bit-stream (BS) comprising cyclically and sequentially scanned parts (P1,P2, . . . ) of respective bit-streams (DCT_1 . . . DCT_N) for respective individual blocks of values;
regenerating (112) the respective bit-streams (DCT_1 . . . DCT_N) from the scalable bit-stream (BS); and
decoding (113 . . . 115) the respective bit-streams (DCT_1 . . . DCT_N).

14. A scalable decoder (11) comprising:
means for receiving (111) a scalable bit-stream (BS) comprising cyclically and sequentially scanned parts (P1,P2, . . . ) of respective bit-streams (DCT_1 . . . DCT_N) for respective individual blocks of values;
means for regenerating (112) the respective bit-streams (DCT_1 . . . DCT_N) from the scalable bit-stream (BS); and
means for decoding (113 . . . 115) the respective bit-streams (DCT_1 . . . DCT_N).

15. A receiver comprising:
a scalable decoder (11) as claimed in claim 14; and
means for outputting (12) the decoded bit-stream.

16. A scalable bit-stream (BS) comprising cyclically and sequentially scanned parts (P1,P2, . . . ) of respective bit-streams (DCT 1 . . . DCT_N) for respective blocks of coefficients.

17. A storage medium (10) characterized in that a scalable bit-stream (BS) as claimed in claim 16 has been stored on the storage medium (10).

* * * * *